Dec. 17, 1963 L. M. LEEDS 3,114,844
TWO TRANSISTER GATE CIRCUIT
Filed Oct. 14, 1958 2 Sheets-Sheet 1

INVENTOR:
LAURANCE M. LEEDS,
BY Joseph P. Kates
HIS ATTORNEY.

Dec. 17, 1963 L. M. LEEDS 3,114,844

TWO TRANSISTER GATE CIRCUIT

Filed Oct. 14, 1958 2 Sheets-Sheet 2

INVENTOR:
LAURANCE M. LEEDS,
BY Joseph P. Kates
HIS ATTORNEY.

United States Patent Office 3,114,844

Patented Dec. 17, 1963

3,114,844

TWO TRANSISTOR GATE CIRCUIT

Laurance M. Leeds, Syracuse, N.Y., assignor to General Electric Company, a corporation of New York Filed Oct. 14, 1958, Ser. No. 767,142
10 Claims. (Cl. 307—88.5)

Figure 1:
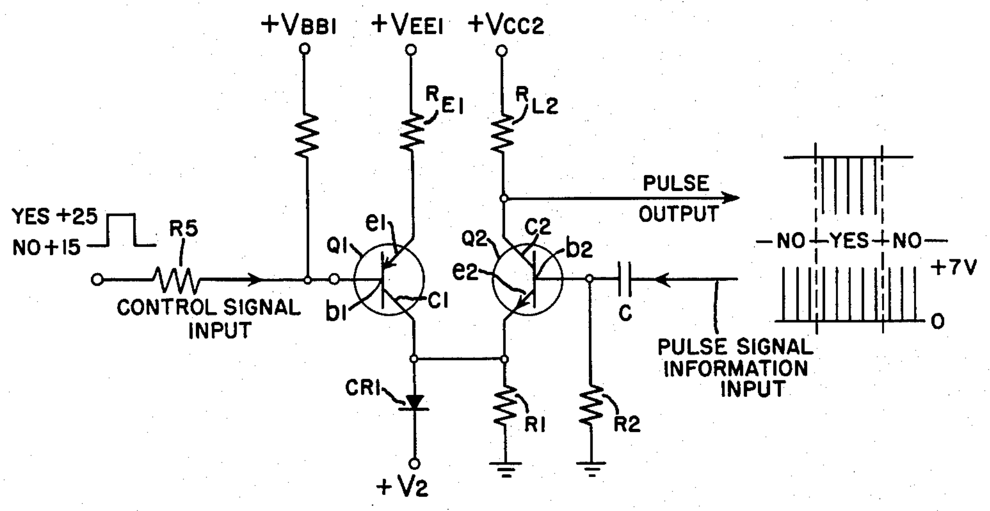

The present invention relates to a gate circuit and more particularly relates to a controlled gate circuit adaptable, for example, for use in television synchronizing generator applications or computer applications wherein stringent conditions for gating may be imposed in order that passage or rejection of signals therethrough may be performed in as few stages as possible and in a manner to satisfy such conditions.

Prior art gating devices employed dual control pentode gates wherein the pulse information signal could be applied to the number one grid and the D.-C. control signal could be applied to the number three or screen grid and also included diode logic circuitry. Such devices, however, introduced complication, they were not sufficiently stable in some instances, they were not adaptable to optimum use as "and" circuits, and they caused undesirable reaction back upon the generators of prior circuits. Diode logic circuits in particular had the undesirable loading or reaction back disadvantage.

The present invention overcomes these and other disadvantages of the prior art and in addition provides a simple, stable, "and" means which will pass positive information signal input in the presence of positive control voltage to provide a negative output; and which will conversely pass negative information signal input in the presence of negative control voltage to provide a positive output. The present invention also provides advantages over the prior art in minimizing or eliminating loading effects on prior circuits as, for example, a delay line and also eliminates occurrence of pedestals which latter pedestals would require further circuits if present to produce a desired output waveform effect. This eliminates a detriment of vacuum tube gating circuits. The occurrence of pedestals causes undesirable effects such as appearance of the control signal in the output of the gate which requires additional circuits to provide a useable signal output. The present circuit also has advantages in that it provides a method and means to permit turning on the gate in the presence of a relatively positive control signal input which is the signal which occurs in application, for example, as in television synchronizing generators wherein the control signal may be a D.-C. control signal to allow or deny passage of information pulses obtained from taps on a delay line. Similarly, wherever the source of control signal is more conveniently useable as a negative input for positive output in the presence of negative information signals, the present inventive circuit may be utilized to advantage. Another advantage of the present invention over the prior art is the feature that both the control circuit and the signal circuit exhibit voltage gain.

Accordingly, an object of the present invention is to provide a pulse gate able to utilize a series of positive pulses (or alternatively negative) representing pulse signal information input together with a positive (or alternatively negative when the information signals are negative) control signal input in order to produce a useable pulse output when these signals are in coincidence and to reject information pulse input when the control signal voltage is in a state opposite the state of the information signals so that coincidence must be present to permit gating to occur.

Another aim of the present invention is to provide for a coincidence gate circuit wherein both the control circuit and the signal circuit exhibit voltage gain.

Another purpose of the present invention is to provide a relatively simple and stable "and" circuit which will include signal information signal translating means having a high input impedance and which circuit will not react back upon the generators or prior circuits to load down an input circuit which input circuit may, for example, be a delay line.

Another object of the present invention is to provide a gating circuit wherein the control circuit and the signal circuit will have no appreciable reaction upon the driving sources so as to thereby minimize or eliminate undesirable transients at the driving sources.

Another aim of the present invention is to provide for a pulse gate circuit including a control circuit and a signal circuit both exhibiting voltage gain and wherein the control signal will not appear in the output of the signal circuit and which gate circuit will be suitable for gating signal information in the form of pulses of a predetermined polarity, the passage of signal information being controlled by control information in the form of relatively long word information of the same polarity as the signal information to provide an ouput of the opposite polarity.

Still another purpose of the present invention is to provide a gating circuit to provide an information output selected from a controlled information input which output will be of maximum useable and pure form.

Another object of the present invention is to provide a transistor gate circuit in which necessity for change of transistors because of aging and other deleterious effects on such transistors will be minimized or substantially eliminated and which will provide for protection against and compensation for change in characteristics of transistors.

Figure 2:
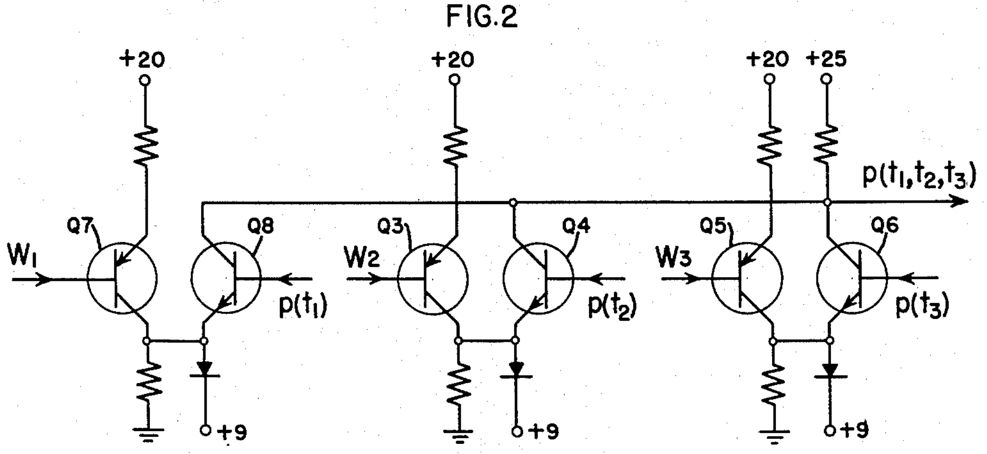
Figure 3:
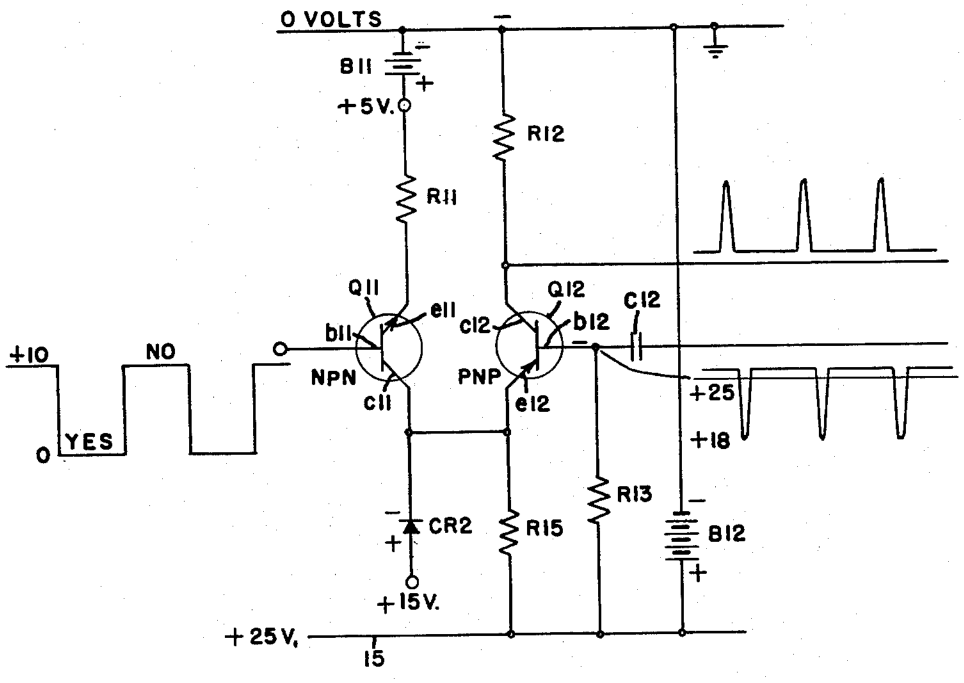

While the novel and distinctive features of the invention are particularly pointed out in the appended claims, a more expository treatment of the invention, in principle and in detail, together with additional objects and advantages thereof, is afforded by the following description and accompanying drawings in which:

FIG. 1 is a schematic representation of a first preferred embodiment of the pulse gate circuit of the present invention adapted to produce a negative output upon coincident input of positive information signals and relatively positive control voltage;

FIG. 2 is a schematic representation of an application of the illustrative embodiment of the control gate pulse mixing circuit of the present invention which application illustrates a circuit adapted to handle three different sets of pulses occurring at different relative times to gate through signal information to a common output in accordance with three separate and distinct control signals; and FIG. 3 is a schematic representation of an alternative preferred embodiment of the pulse gate circuit of the present invention adapted to present positive output upon coincident input of negative information signals and negative control voltage.

Referring now to the drawings and in particular to FIG. 1, control signal input (word gate input) may be applied through base *b1* of a transistor Q1 which transistor may be, for example, the General Electric 2N43 type. Transistor Q1 may be a PNP type transistor and may also comprise a collector *c1* and an emitter *e1*. The word signal input may, for example, be of the form of a square wave signal and may have a duration which will vary in accordance with the information presented. The requirement of the input waveform is that it be relatively positive during certain periods of time and relatively negative during other periods of time. While a square wave shape has been shown for purposes of description, it should be realized that any type of waveform which can go positive for a duration of time and then negative for a duration of time can be utilized as the control signal input. A voltage of positive 20 volts may be applied to the emitter $e1$ from a voltage source VEE1 through an emitter resistance $R_{E1}$ disposed between the source of voltage VEE1 and the emitter $e1$ of transistor Q1. A second transistor Q2 may be provided which may be of the NPN type and may be a General Electric Company 2N167 transistor. Transistor Q2 may comprise an emitter $e2$, a collector $c2$ and a base $b2$. Disposed between the collector $c2$ of the transistor Q2 and a source of positive voltage VCC2 which may be of the order of +25 volts may be a collector resistor $F_{L2}$. Output may be taken at the collector of transistor Q2 at the point designated Pulse Output. The emitter $e2$ of transistor Q2 may be joined to the collector $c1$ of transistor Q1 and at a common junction point may be grounded through a resistor R1. A positive voltage V2 may be applied at the junction point between the emitter $e2$ of transistor Q2 and the collector $c1$ of transistor Q1 through a diode CR1 which may be a crystal diode, for example. Disposed between the base $b2$ of transistor Q2 and ground may be a base resistor R2. Input coupling of signal information (as pulse signal information) may be effected at the base $b2$ of transistor Q2 through a capacitor C or alternatively direct coupling through a resistance (not shown) can be utilized providing that the input voltage is referred to a zero reference by the circuit prior to the input of the transistor Q2 stage.

Referring now to FIG. 2, it will be apparent that a plurality of the circuits of FIG. 1 may be joined together by connecting the collectors of the respective transistors Q8, Q4 and Q6 so as to enable utilization of each circuit with a different control signal input and have a common connection to all of the collectors (common output). In this case three different sets of pulses occurring at different relative times are gated through to a common output in accordance with three separate control signals.

Now referring again to FIG. 1, pulse signal information input may be applied through coupling capacitor C which pulse signal information may, for example, comprise a series of positive pulses. At the time the series of positive pulses is applied to the base $b2$, transistor Q2 will pass these information pulses when its emitter $e2$ is at ground potential (or below the potential of the applied pulses). This condition will come about when transistor Q1 is in a non-conducting state. When transistor Q1 conducts then its collector is raised in positive potential (and current flow through resistor R1 occurs) thus raising the potential of the emitter of transistor Q2. This condition causes transistor Q2 to be biased so that input pulses to transistor Q2 will not pass through. When the control signal at the input of base $b1$ is relatively positive (for example, plus 25 volts compared to a collector voltage of plus 20 volts), transistor Q1 being a PNP transistor will be cut-off and the collector of transistor Q1 will be substantially at ground potential since there will be no appreciable current flow through resistor R1. In this condition, since there is no current flow through resistor R1, there will be no bias across that resistor, hence, positive pulses incident on the basis $b2$ of transistor Q2 will be accepted, and will be amplified, inverted, and appear at the output terminal as a series of negative pulses. When the control signal at the input of transistor Q1 is relatively negative, current will flow through transistor Q1, and a voltage drop will appear across resistor R1 because of current flow through that resistor. With the emitter $e2$ of transistor Q2 which is connected to the collector $c1$ of transistor Q1 thus raised in potential by a sufficient amount because of the voltage across resistor R1, pulses incident on the input of transistor Q2 will not cause conduction through transistor Q2 and the pulses will thereby be rejected. Therefore, in order for signal information pulses to be passed, the control signal must be relatively positive so as to cut-off transistor Q1 and simultaneously positive pulses must appear at the base $b2$ of transistor Q2 to cause conduction of that transistor and this creates negative output pulses at collector $c2$.

Restating, when the control signal incident on base $b1$ and coupled through resistor R5 is relatively positive to the emitter $e1$ voltage transistor Q1 being a PNP transistor is cut-off and the collector $c1$ of transistor Q1 will be substantially at ground potential since no current is flowing through transistor Q1 and, therefore, flowing through resistor R1 to cause voltage to be developed across resistor R1. In this condition, since there is no bias across resistor R1 (at the emitter $e2$), positive pulses which are incident on transistor Q2 will be amplified and inverted through transistor Q2 and appear at the output terminal. Thus, the positive pulses incident on base $b2$ and coupled through capacitor C or in an alternative embodiment directly coupled (as through a resistor) will be developed through base $b2$ to ground resistor R2 of transistor Q2 and the emitter $e2$ in following the positive instantaneous voltage at the base $b2$ will cause current flow through the transistor Q2, and through resistor $R_{L2}$ which will cause a decrease in voltage at the collector $c2$ of transistor Q2 thereby forming an amplified negative pulse output corresponding with the positive pulse input through capacitor C.

When the control signal applied to base $b1$ of transistor Q1 is relatively negative compared to its emitter $e1$ voltage, transistor Q1 is in a conductive condition and the current will flow through the transistor across resistor R1 thereby causing a voltage drop across resistor R1. With the emitter $e2$ of transistor Q2 thus raised in potential by a sufficient amount, positive pulses incident on base $b2$ of transistor Q2 will be ineffective to cause conduction, thereby rejecting the pulses.

The input impedance of transistor Q2 may be of high value, closely approximate to the parallel combination of the base to ground input resistance and the D.-C. current gain of transistor Q2 multiplied by the resistance of resistor R1 (or input $Z \cong \|$ of R2 & BR1, when B is the D.-C. current gain of transistor Q2).

In the above-described manner, the PNP transistor Q1 prevents pulse signal information input from being accepted and producing output when the base $b1$ of the PNP transistor Q1 is negative with respect to its emitter $e1$ and conversely signal input information is permitted to produce an output at the collector of transistor Q2 when the base $b1$ of transistor Q1, the PNP transistor is positive with respect to its emitter $e1$ so that its base $b1$ in effect produces cut-off condition of transistor Q1.

A diode which may, for example, be a crystal diode CR1 as shown in FIG. 1 may be attached to a source of positive voltage $V_2$ which, for example, may be of the order of plus 9 volts. The plate of diode CR1 may be connected to the junction between resistor R1 and the emitter $e2$ of transistor Q2 and the collector $c1$ of transistor Q1.

Since the D.-C. current gain of transistors varies over a considerable range between transistors of a particular type, it is advantageous to clamp the voltage excursion of the collector $c1$ of transistor Q1 by means of the diode clamp CR1. This clamp action also assists in proportioning the circuit values so that the transistor can be kept out of saturation. The action of the diode is as follows:

When conduction such that the voltage at the junction point between resistor R1 and the collector $c1$ of transistor Q1 and emitter $e2$ of transistor Q2 would rise above 9 volts because of conduction through the transistor Q1, the flow of current that thereby results through the diode CR1 tends to hold the junction point, that is, to clamp it at +9 volts and not permit a rise in voltage above this point. In this manner the effect of temperature and other ambient conditions is overcome and in addition transistor Q1 may be designed in the circuit to carry a higher current than would be necessary to sustain a +9 volts limit at the junction J1. Thus, as the transistor ages or changes occur to cause lesser current flow in the transistor (change in characteristics), replacement of transistors will not be necessary since a transistor may be originally selected to carry a current exceeding that which would cause a higher voltage than 9 volts at the junction J1. The diode clamp CR1 thus both protects against adverse effects and prolongs the time during which the circuit can operate without replacement of transistors. The clamping diode limiter in addition limits the positive swing of the collector of transistor Q1 so that under adverse temperature or other conditions, transistor Q1 will not become saturated which if allowed to occur would increase the time required to cause the transistor Q1 to cease conduction. Thus, the diode CR1 permits a relatively fast transition in state of transistor Q1.

Referring again to FIG. 1 and the illustrative embodiment of the pulse gate circuit of the invention, the stage of transistor Q2 may be a simple pulse inverter stage coupled to a prior stage by capacitive coupling or in the alternative direct coupled to the prior stage. With the input pulses swinging, for example, from zero to +7 volts, transistor Q2 will be blocked if the voltage on its emitter exceeds +7 volts. This control is provided by the PNP transistor stage Q1. When the gate control signal is, for example, at plus 15 volts which may correspond to the "No" condition, transistor Q1 is highly conductive pulling its collector positive. This positive swing is clamped by the diode CR1 so that it can not exceed +9 volts. Thus, the emitter of transistor Q1 will also be at +9 volts and transistor Q2 will be blocked. That is, as stated, transistor Q2 is blocked when its emitter exceeds +7 volts which is the swing provided, for example, by the input pulses on transistor Q2 as limited by diode CR1. When the gate input to the base *b1* of transistor Q1 swings, for example, to a +25 volts level corresponding to the "Yes" condition, transistor Q1 will become non-conducting, its collector will then drop to zero thus removing the blocking bias from the emitter of transistor Q2 and hence opening the pulse gate. Thereafter, pulses in this condition may be inserted into the base of transistor Q2 and will appear at the collector *c2* of transistor Q2 as negative going pulse output. The action is illustrated by the waveforms shown to the left and to the right of FIG. 1, the pulse gate circuit.

Referring to FIG. 3 of the drawings, a circuit is shown whereby in the presence of negative information impressed upon the pulse signal information input transistor stage and in the presence of a relatively negative control signal, positive pulses may occur in the output. The circuit may comprise a first NPN transistor Q11 which may have an emitter *e11*, a base *b11*, and a collector *c11*. The control signal input may be applied to base *b11*. Disposed between the emitter *e11* of transistor Q11 and ground may be in series a resistor R11 and a bias means schematically represented as the battery B11. Electrically connected to the collector *c11* may be a diode CR2 which, for example, may be a crystal diode having its cathode connected to the collector *c11* and having its plate connected to a source of positive voltage which, for example, may be +15 volts as illustrated. A second transistor stage Q12 may have a collector *c12*, a base *b12*, and an emitter *e12*. Disposed between ground and the collector *c12* may be a resistor R12. As shown, the output is taken from the collector of transistor Q12. Transistor Q12 may be a PNP type transistor and capacitive coupled information signal input may be applied through capacitor C12 to the base *b12* of transistor Q12. Disposed between ground and a positive voltage bus 15 may be a source of positive voltage which is schematically represented as the battery B12. Battery B12 may have its plus terminal at the bus line which, for example, may be at +25 volts potential and may have its negative side tied to ground. A resistance R13 to provide for developing the input information signal may be disposed between the base *b12* and the input capacitor C12 on one side and on the other side may be connected to the bus line 15. The collector *c11* of transistor Q11 and the emitter *e12* of transistor Q12 may be electrically connected to each other and disposed between the connection of collector *c11* and emitter *e12* and the bus line 15 may be a resistor R15. The circuit illustrated in FIG. 3 is adapted to receive negative signal information input and in the presence of relatively negative control voltage a positive output will be provided. As may readily be seen upon comparison of FIG. 1 and FIG. 3, FIG. 3 in general provides a circuit which is responsive to an opposite set of conditions of relatively negative input to each of the bases of the transistors to provide a positive output. This reverse action of the FIG. 1 embodiment may be utilized for opposite input and output conditions desired. Referring to the waveform shown at the right of transistor Q12 at the input and at the left input of transistor Q11 operation will take place as follows:

Whenever the input control voltage is above 5 volts on the base of *b11* the input diode (emitter to base of transistor Q11) will have the condition that the base *b11* voltage is above the emitter voltage and hence the NPN transistor Q11 will conduct causing a voltage to be developed across resistor R15 which will cut-off conduction of the PNP transistor Q12 and hence pulse input of magnitude less than 10 volts from peak to peak can not be passed through transistor Q12. Under these conditions there will be no output from transistor Q12. The relatively positive voltage waveform on the base *b11* of the control transistor Q11 thus corresponds to a no or no word condition. Upon the swing of the input control waveform to the negative side designated as the yes word signal, the NPN transistor Q11 will be cut-off and conduction will not occur through resistor R15. Under these conditions a negative input signal coupled through capacitor C12 to the base *b12* of transistor Q12 will cause PNP transistor Q12 to conduct and the voltage developed across resistor R12 by current flow (considered as electron current flow for purposes of description) from ground through resistor R12, through the transistor Q12 and thence through resistor R15 will cause a positive voltage to occur at the collector *c12* of transistor Q12. The base voltage of the PNP transistor upon occurrence of negative pulses will be at a relatively negative potential with respect to the emitter *e12* (at a relatively negative potential with respect to the 25 volts potential present at the emitter *e12* of the PNP transistor Q12 under conditions of no current flow through resistor R15). Under these circumstances the voltage across the input diode (emitter to base) of emitter *e12* to base *b12* of transistor Q12 will be such as to facilitate current flow through the PNP transistor. It is noted that the voltage on base *b12* will be that voltage at the side of resistor R13 opposite the side connected to the +25 volts in the absence of input signal. Hence, the 25 volts potential of the bus line 15 will appear at base *b12* of the transistor in the absence of current flow through resistor R13. This causes absence of conduction in the absence of a negative swing signal below the 25 volts level at the base *b12*. The diode CR2 operates in a manner similar to the diode CR1 shown in FIG. 1 although in this case as hereinabove described the cathode is electrically connected to the collector *c11* of the control transistor Q11 and the plate is connected to a positive voltage source which as shown may be +15 volts. This prevents over conduction through transistor Q11 and will keep the junction between collector *c11* and emitter *e12* at a voltage which will not go below +15 volts and presents other advantages heretofore described.

Again referring to FIG. 2, three different sets of pulses occurring at different relative times may be gated through to a common output in accordance with three separate control signals. This function is provided by mixing at the collectors of the pulse amplifier circuit. In the pulse gate of transistors Q7 and Q8, a pulse train at relative time *t1* may be gated by control signal W1 incident on transistor Q7. Similarly, a pulse train at time *t2* may be gated by the control signal W2 incident on the input of transistor Q3 and a pulse train at time *t3* may be gated by control signal W3 incident on the input of transistor Q5. The output from the common collector connection may then comprise pulses at the three relative times *t1*, *t2*, and *t3*, each set being in accordance with its particular control signal as, for example, from foregoing logic circuits. In this manner, three different sets of pulses, occurring at different relative times may be gated through to a common output in accordance with three separate word signals. This function is performed as shown by combining the three gates as shown in FIG. 2 and mixing at the collectors of the pulse amplifiers, the collectors of transistors Q8, Q4, and Q6 being electrically joined and output being taken at the joined collectors.

While in nowise to be construed as limiting the invention, the following set of values has been used in an operative embodiment of the invention:

Q1=2N43
Q2=2N167
VEE1=+20 volts
VCC2=+25 volts
V2=+9 volts
R1=4700 ohms
$R_{L2}$=4700 ohms While the principles of the invention have now been made clear, there will be immediately obvious to those skilled in the art many modifications in structure, arrangement, proportions, the elements and components used in the practice of the invention, and otherwise, which are particularly adapted for specific environments and operating requirements without departing from those principles. The appended claims are therefore intended to cover and embrace any such modifications within the limits only of the true spirit and scope of the invention.

What is claimed is:

1. A pulse gate circuit comprising a signal transistor stage, a control transistor stage, each of said stages exhibiting voltage gain, means to impress positive pulse signals on said signal stage, means to impress a varying voltage on said control stage, the emitter of said signal stage being electrically connected to the collector of said control stage, a resistor disposed at the junction between the connection of the emitter of said signal stage and the collector of the control stage and ground, and means to limit said junction point below a predetermined voltage level.

2. A coincidence gate circuit comprising a first NPN type transistor, a second PNP type transistor, each of said transistors comprising an emitter, a base and a collector, means to provide a positive signal representing signal information input to the base of said first transistor, means to provide a control signal representing relatively long periods of time duration with respect to said information signals on the base of said second transistor, the collector of said PNP transistor being electrically connected to the emitter of said NPN transistor, a resistor disposed between the junction of said PNP collector and said NPN emitter and ground, means to maintain said junction below a predetermined positive voltage, said control signal input transistor thereby controlling said first transistor, said second transistor being cut-off and having its collector at substantially ground potenial when the control signal input of said second transistor is relatively positive such that substantially zero bias appears across said resistor so that positive pulses incident on said first transistor are accepted, amplified and inverted to appear at said first transistor collector.

3. A gate circuit comprising a first NPN transistor stage comprising an emitter, a base and a collector, a second PNP transistor stage comprising an emitter, a base and a collector, a positive source of voltage and a resistor connected to the emitter of said second stage, a positive source of voltage and a resistor connected to the collector of said first stage, means to take output from the collector of said first stage, the collector of said second stage being joined electrically to the emitter of said first stage, a resistor disposed between the junction point of said collector and said emitter and ground, such that when the second transistor stage is cut-off its collector and hence the junction point is substantially at ground potential such that there is substantially zero bias across said resistor and positive pulses which are incident on the base of the first transistor will be amplified and inverted to appear at the first stage collector output.

4. The apparatus of claim 3 including means to clamp said junction point such that it does not rise above a predetermined positive potential.

5. The apparatus of claim 4 including means to couple positive pulse signal information input into said first transistor and means to couple control signal input into said second transistor, said control signal input comprising alternatively relatively positive and relatively negative voltage, said pulse signal information input comprising positive signals to thereby provide a negative output when said control signal input is positive and said pulse signal information input is simultaneously positive.

6. A controlled gate apparatus, said apparatus comprising a first NPN type transistor having an emitter, a base, and a collector, a first load resistor connected to said collector, a positive voltage source connected to the side of said load resistor opposite said collector, means to couple input positive information pulse signals into the base of said first transistor, a second resistor disposed between the emitter of said first transistor and ground, a second PNP type transistor having a collector, an emitter, and a base, a third load resistor connected at one end to said emitter, a source of positive voltage connected to the other end of said third resistor, the collector of said second transistor being connected electrically to the emitter of said first resistor, means to couple alternating relatively positive and relatively negative control signals into the base of said second transistor, the circuit being operative such that when the control signal is relatively positive said second transistor is cut-off and its collector is substantially at ground potential, in this condition, there being essentially zero bias across said connection point to ground second resistor, thereby permitting positive pulses incident on the base of said first transistor to be accepted, amplified and inverted and appear at the output terminal as negative pulses and when the control signal is relatively negative, said second transistor goes into conduction such that a drop appears across said second resistor disposed between the connection point and ground, the emitter of said first transistor thus being raised in potential by an amount such that incident pulses on the base of said first transistor are ineffective to cause conduction thereof thus rejecting the pulses.

7. The apparatus of claim 6 including means to prevent excursions beyond a predetermined amount in the positive direction at the junction point between the emitter of said first transistor and the collector of said second transistor.

8. The apparatus of claim 7 wherein said means to prevent excursions comprises a diode having its plate connected to the connection point between the emitter of said first transistor and the collector of said second transistor and having its cathode connected to a source of positive voltage of a predetermined value and including negative pulse output means disposed at the collector of said first transistor.

9. A control gate pulse mixing circuit comprising a first NPN transistor, a second PNP transistor, the emitter of said first transistor being directly electrically connected to the collector of said second transistor, a third NPN transistor, a fourth PNP transistor, the emitter of said third transistor being connected to the collector of said second transistor, a fifth NPN transistor, a sixth PNP transistor, the emitter of said fifth NPN transistor being connected to the collector of said sixth PNP transistor, a resistor disposed between each of said direct connection points and a common reference point, means to provide a different control signal input to each of said second, said fourth, and said sixth transistors, means to provide positive signal inputs at differing times to said first, third and fifth transistor inputs, the collector of said first transistor being connected to the collector of said third transistor and the collector of said fifth transistor, thereby providing a control for positive assertion wherein when each of the control signal inputs are simultaneously relatively positive, pulses will be passed to said collectors, and wherein multiple control causes a logical or for negative sense denial when any of the three control signal inputs is relatively negative such that the passage of pulses is denied.

10. A gate circuit including a control stage comprising a first transistor of a first conductivity type connected in common emitter configuration, said control stage having input terminals for connection to a source of control potentials coupled to the base electrode of said transistor for controllably rendering said transistor conductive or non-conductive, and a collector electrode having connected thereto a load resistance in which said changes in conductivity appear as changes in potential; a controlled signal processing stage comprising a second transistor of a conductivity type complementary to that of said first transistor, said transistor being coupled in common emitter configuration, said stage having input terminals for connection to a source of unidirectional signal pulses coupled to the base electrode of said second transistor, and output terminals for derivation of output signal pulses coupled to the collector electrode of said second transistor, and means direct coupling said emitter electrode of said second transistor to the collector electrode of said first transistor for applying said changes in potential to the emitter of said second transistor and thereby controlling the passage of pulses through said second transistor.

References Cited in the file of this patent

UNITED STATES PATENTS

| | | |
|---|---|---|
| 2,557,644 | Forbes | June 19, 1951 |
| 2,868,897 | Hamilton | Jan. 13, 1959 |
| 2,943,260 | Barnard | June 28, 1960 |

FOREIGN PATENTS

| | | |
|---|---|---|
| 645,628 | Great Britain | Nov. 1, 1950 |

OTHER REFERENCES

Henle et al.: publication "The Application of Transistors to Computers," pages 1240–1254, Proceedings of the IRE, June 16, 1958, vol. 46, No. 6.

Cavalieri Jr.: publication "What's Inside Transac?" from "Electronic Design," vol. 4, No. 13, July 1, 1956. Pages 22–25.

Hunter Handbook of Semiconductor Electronics, published October 15, 1956, McGraw-Hill Book Co., New York, pages 15–46.

Hurley: Junction Transistor Electronics, Wiley & Sons, N.Y., 1958, pages 382 to 386 (page 384 relied on).

Shea: Transistor Circuits, Wiley & Sons, N.Y. 1953 (page 98 relied on).